(12) United States Patent
Maeda

(10) Patent No.: US 9,684,180 B2
(45) Date of Patent: Jun. 20, 2017

(54) COLOR SEPARATING/COMBINING SYSTEM AND IMAGE DISPLAY APPARATUS USING THE SAME

(71) Applicant: CANON KABUSHIKI KAISHA, Tokyo (JP)

(72) Inventor: Yuuki Maeda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 14/698,559

(22) Filed: Apr. 28, 2015

(65) Prior Publication Data

US 2015/0316782 A1    Nov. 5, 2015

(30) Foreign Application Priority Data

Apr. 30, 2014  (JP) ................. 2014-093884
Apr. 20, 2015  (JP) ................. 2015-086264

(51) Int. Cl.
*G03B 21/20* (2006.01)
*G02B 27/28* (2006.01)
*G03B 21/00* (2006.01)
*G02B 27/14* (2006.01)
*G03B 33/12* (2006.01)

(52) U.S. Cl.
CPC ......... *G02B 27/283* (2013.01); *G02B 27/141* (2013.01); *G03B 21/006* (2013.01); *G03B 21/2073* (2013.01); *G03B 33/12* (2013.01)

(58) Field of Classification Search
CPC ........ G02B 27/28; G02B 27/14; G03B 21/14; G03B 21/00; G03B 21/20; H04N 9/31
See application file for complete search history.

(56) References Cited

U.S. PATENT DOCUMENTS

| 6,042,236 | A  | * | 3/2000 | Hatakeyama | ........ | G02B 27/102 |
|   |   |   |   |   |   | 348/E5.141 |
| 2008/0079872 | A1 | * | 4/2008 | Yamauchi | ........... | H04N 9/3167 |
|   |   |   |   |   |   | 349/97 |
| 2011/0025965 | A1 |   | 2/2011 | Yamaguchi |   |   |

FOREIGN PATENT DOCUMENTS

| JP | 2001-154268 A | 6/2001 |
| JP | 2002-169221 A | 6/2002 |
| JP | 2006-047947 A | 2/2006 |
| JP | 2014-41229 A  | 3/2014 |

* cited by examiner

*Primary Examiner* — Sultan Chowdhury
*Assistant Examiner* — Danell L Owens
(74) *Attorney, Agent, or Firm* — Canon USA, Inc. I.P. Division

(57) ABSTRACT

A color separating and/or combining system configured to guide blue (or first) light in a light beam from a light source to a blue-light (or first-light) liquid crystal panel and to guide red (or second) light to a red-light (or second-light) liquid crystal panel includes a PBS configured to guide one of the blue (or first) light and the red (or second) light in a direction different from a direction of the other color light, a quarter-wave plate, and a color separation element configured to guide the blue (or first) light to the blue-light (or first-light) liquid crystal panel and to suppress the red (or second) light from being guided to the blue-light (first-light) liquid crystal panel. The quarter-wave plate and the color separation element are provided between the blue-light (first-light) liquid crystal panel and the PBS. The color separation element is provided between the PBS and the quarter-wave plate.

7 Claims, 9 Drawing Sheets

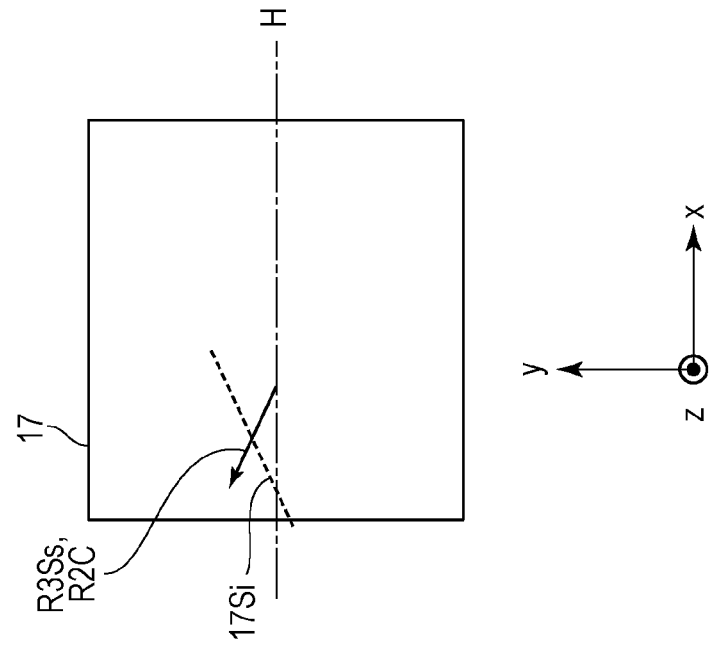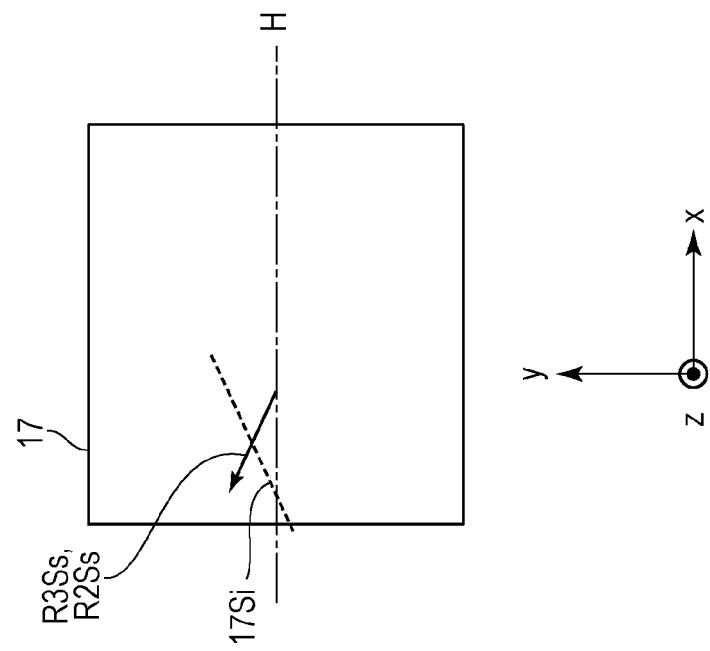

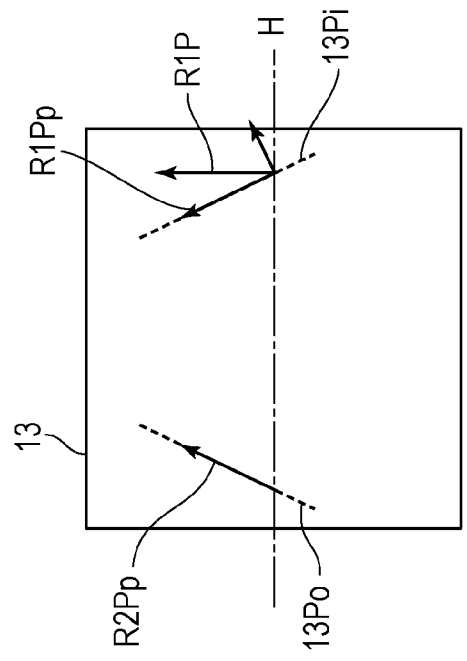
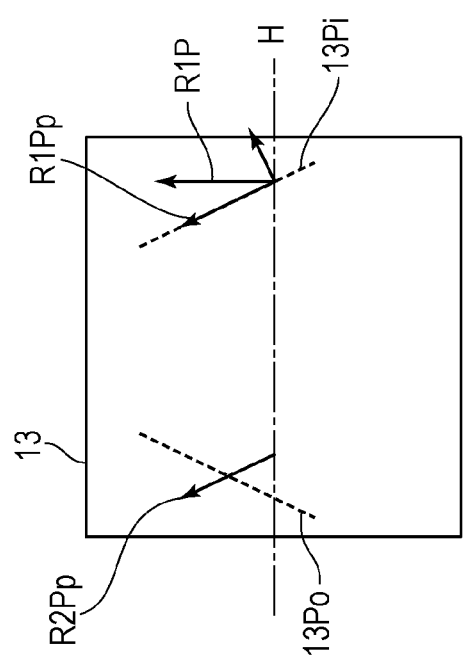

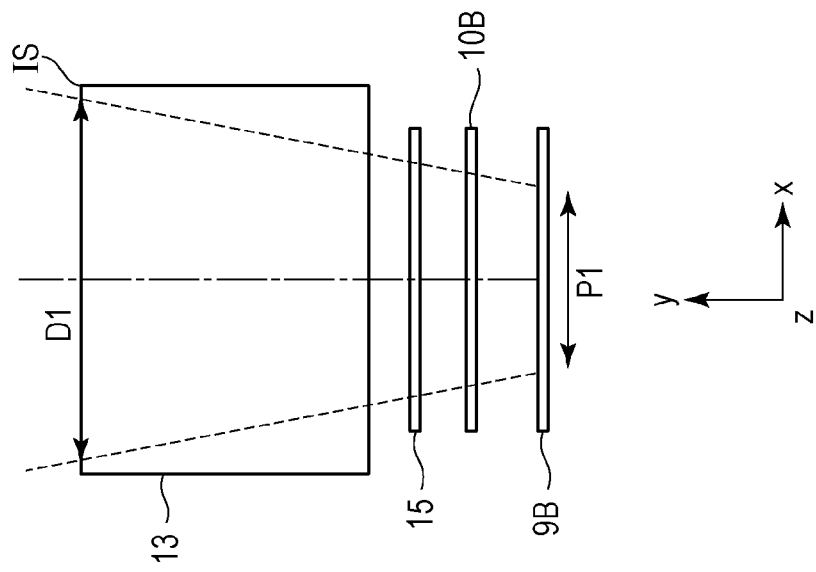
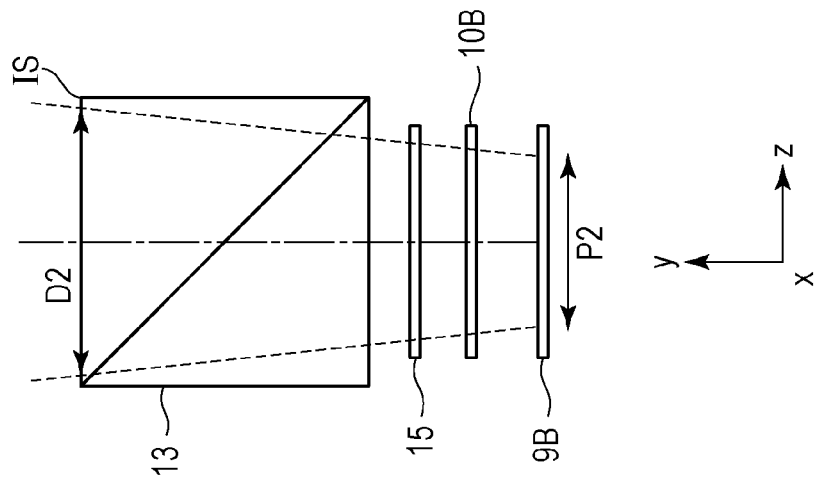

COLOR SEPARATING/COMBINING SYSTEM AND IMAGE DISPLAY APPARATUS USING THE SAME

BACKGROUND OF THE INVENTION

Field of the Invention

The present inventions relate to one or more color separating/combining systems (also referred to herein as "separating and/or combining systems"), one or more color separating and/or combining devices, and one or more image display apparatuses, such as a projector, using the one or more color separating/combining systems and/or devices.

Description of the Related Art

To project color images of red, green, and blue (R, G, and B) colors, a liquid crystal projector uses a color separating/combining system. The color separating/combining system separates white light from a light source into R, G, and B light components, guides the light components to liquid crystal panels, and recombines the light components modulated by the liquid crystal panels.

Such a color separating/combining system is disclosed in Japanese Patent Laid-Open No. 2001-154268.

Japanese Patent Laid-Open No. 2001-154268 discloses a technique of achieving size reduction by disposing reflective liquid crystal panels for two colors at one polarization beam splitter (PBS).

SUMMARY OF THE INVENTION

At least one embodiment of a color separating and/or combining system according to an aspect of the present inventions guides a first color light in a light beam from a light source to a first light modulation element and guides a second color light that is different in wavelength from the first color light to a second light modulation element. The color separating and/or combining system may include a first polarization element configured to guide one of the first color light and the second color light in a direction different from a direction of the other color light, a first phase difference imparting portion, and a first optical portion configured to guide the first color light to the first light modulation element and to suppress the second color light from being guided to the first light modulation element. The first phase difference imparting portion and the first optical portion may be provided between the first light modulation element and the first polarization element. The first optical portion may be provided between the first polarization element and the first phase difference imparting portion.

According to other aspects of the present inventions, one or more additional color separating/combining systems, one or more image display apparatuses, one or more color separating and/or combining devices and one or more methods for using one or more of the color separating/combining system(s), the color separating/combining device(s) and/or the image display apparatus(es) are discussed herein. Further features of the present inventions will become apparent from the following description of exemplary embodiments with reference to the attached drawings.

BRIEF DESCRIPTION OF THE DRAWINGS

FIGS. 5A and 5B illustrate the directions of an S-polarized light component in incident light on the combining prism.

FIGS. 6A and 6B illustrate the directions of P-polarized light components in the incident light and the emitted light on and from the liquid crystal panel.

FIGS. 7A and 7B illustrate the relationship between the liquid crystal panel and the incident light thereon.

DESCRIPTION OF THE EMBODIMENTS

While the above-described PBS has the property of reflecting an S-polarized light component and transmitting a P-polarized light component, it does not reflect all S-polarized light components and does not transmit all P-polarized light components. In actuality, there are two types of unnecessary light components, that is, an S-polarized light component that should originally be reflected by the PBS, but passes through the PBS and a P-polarized-light component that should originally pass through the PBS, but is reflected by the PBS.

In the above-described structure disclosed in Japanese Patent Laid-Open No. 2001-154268, unnecessary light may be guided to a projection optical system, and this may deteriorate the contrast of an image to be projected.

Accordingly, the present inventions provide at least one color separating/combining system (also referred to herein as at least one "color separating and/or combining system") that can project an image of a higher quality while reducing the influence of unnecessary light.

Preferred exemplary embodiments of the present inventions will be described below with reference to the drawings. It is noted that the shapes and relative positions of components described in the embodiments should be appropriately changed according to the configuration and various conditions of an apparatus to which one or more of the present inventions are applied. That is, the shapes and the like of the components are not specified to intend to limit the scope of the present inventions to the following embodiments.

First Embodiment

Figure 1:
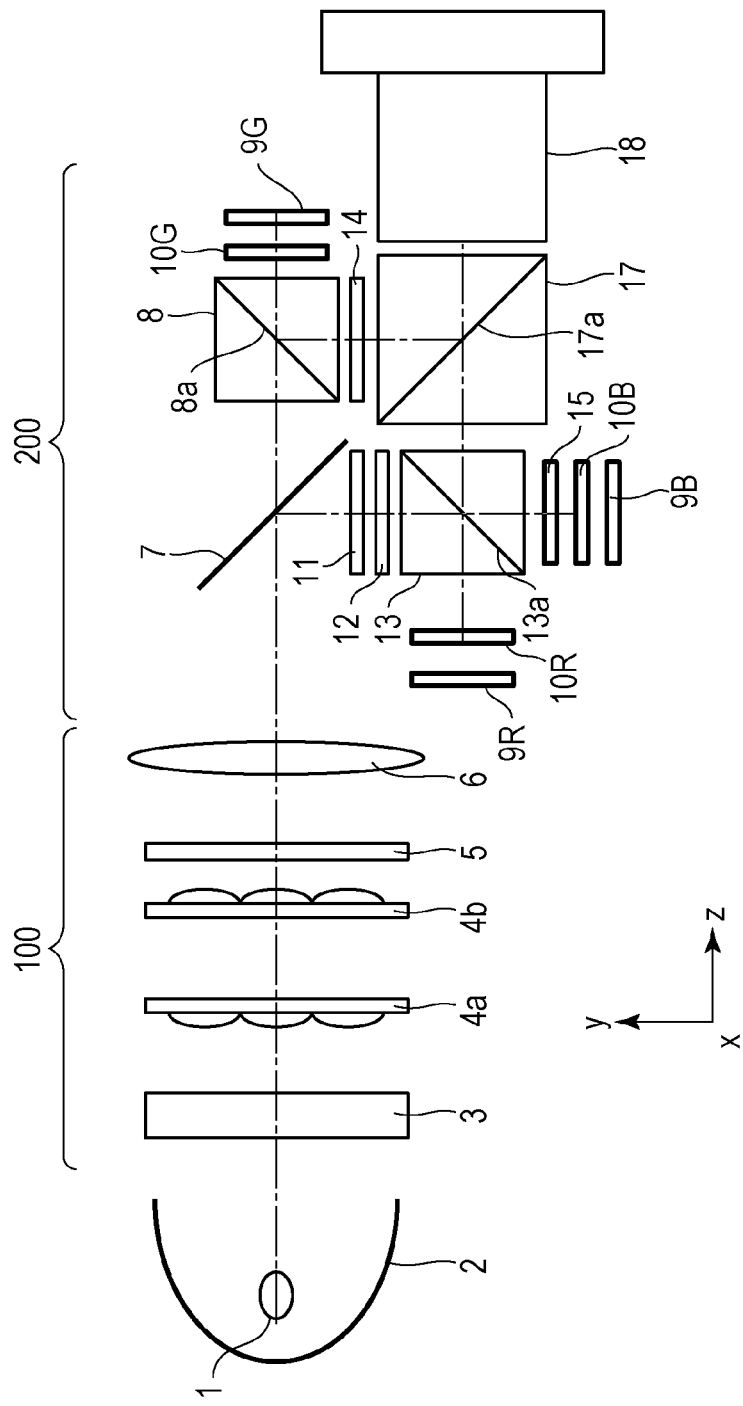
FIG. 1 illustrates the configuration of an image display apparatus including a color separating/combining system according to a first embodiment of the present inventions.

FIG. 1 illustrates the configuration of an image display apparatus including a color separating/combining system according to a first embodiment of the present inventions.

Light emitted from a light source (a light emitting section of a lamp) 1 in all directions is turned into an approximately parallel light beam by a parabolic reflector 2, and is then emitted. The emitted light beam does not always need to be perfectly parallel, and it may slightly diverge or converge within a range such as to endure the use.

The parallel light beam enters a UV-IR cut filter 3, and is separated into a plurality of partial light beams by a first lens array 4a, and the partial light beams are condensed. The partial light beams are condensed near a second lens array 4b to form their respective light source images (secondary light source images). The partial light beams emitted from the second lens array 4b are polarized in the same predetermined polarization direction by a polarization conversion element 5, and are condensed by a condenser lens 6 to superimposingly illuminate reflective liquid crystal panels 9.

The polarization conversion element 5 includes a plurality of PBSs, mirrors, and half-wave plates. In the first embodiment, the light beam incident on the polarization conversion element 5 is turned into P-polarized light.

The above-described components from the UV-IR cut filter 3 to the condenser lens 6 constitute an illumination optical system 100.

A dichroic mirror 7 (third optical portion) has the property of reflecting blue (B) light and red (R) light and transmitting green (G) light.

A PBS 8 (second polarization element) guides a P-polarized light component of green light in a direction different from a direction of an S-polarized light component that is different in the polarization direction from the P-polarized light component. Specifically, the PBS 8 transmits P-polarized light and reflects S-polarized light.

Liquid crystal panels 9 (9R, 9G, and 9B) are a liquid crystal panel for red light, a liquid crystal panel for green light, and a liquid crystal panel for blue light. The liquid crystal panels 9 are light modulation elements that modulate color light and emit modulated light. In the first embodiment, the liquid crystal panels 9 are reflective liquid crystal elements.

Quarter-wave plates 10 (10R, 10G, and 10B) are a quarter-wave plate for red light, a quarter-wave plate for green light, and a quarter-wave plate for blue light.

An incident-side polarizer 11 transmits P-polarized light. A wavelength-selective phase plate 12 turns the polarization direction of red light 90 degrees, and does not turn the polarization direction of blue light.

A PBS 13 (first polarization element) transmits P-polarized light and reflects S-polarized light, and has a polarization splitting surface 13a.

An emission-side polarizer 14 for green light transmits S-polarized light.

A color separation element 15 is provided between the PBS 13 and the quarter-wave plate 10B, and guides blue light to the liquid crystal panel 9B, of the liquid crystal panel 9B and the liquid crystal panel 9R, and suppresses red light from being guided to the liquid crystal panel 9B. Specifically, the color separation element 15 is a first optical portion having an optical function of guiding blue light to the liquid crystal panel 9B by transmitting a P-polarized light component of the blue light and suppressing red light from being guided to the liquid crystal panel 9B by reflecting an S-polarized light component of the red light. The effect of provision of the color separation element 15 will be described later.

Figure 2:
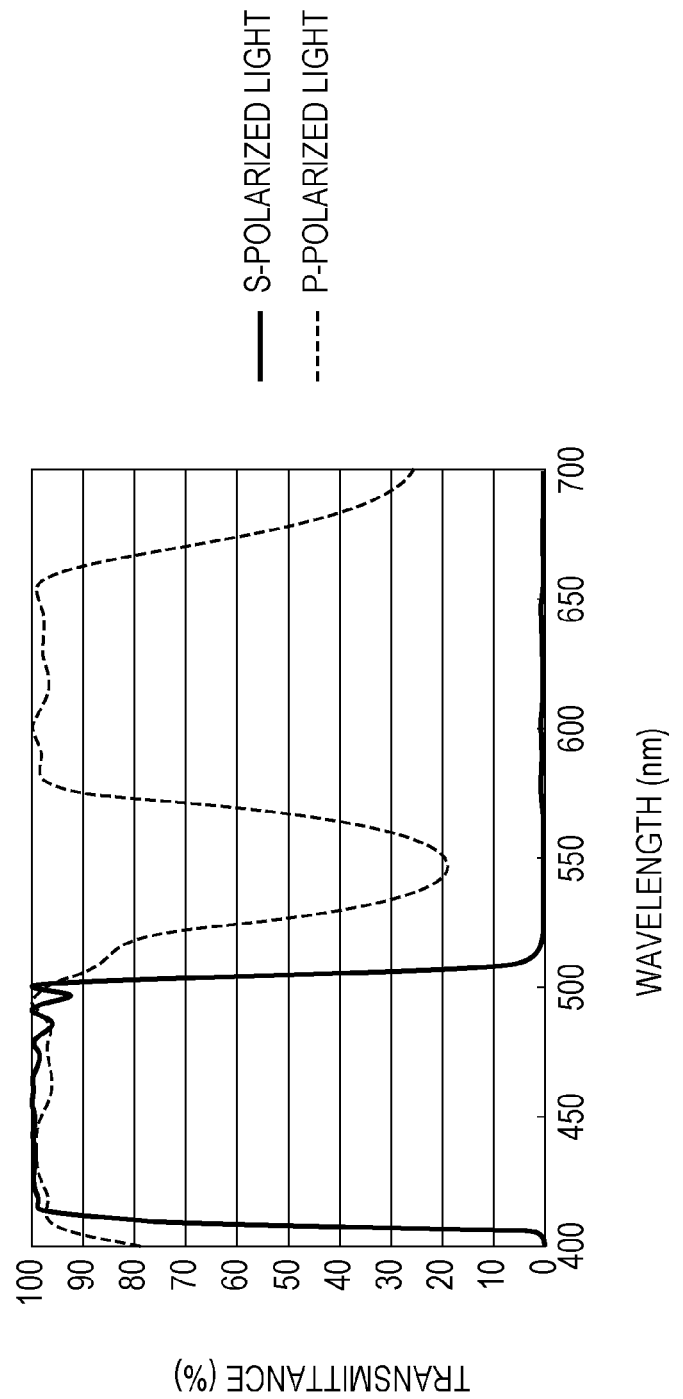
FIG. 2 shows the characteristics of a combining prism.

A combining prism 17 (light combining element) has the characteristics shown in FIG. 2. For blue light and green light, the combining prism 17 functions as a dichroic mirror that transmits the blue light and reflects the green light. In contrast, for red light, the combining prism 17 functions as a PBS that transmits P-polarized light and reflects S-polarized light. That is, the combining prism 17 combines modulated blue light, modulated red light, and modulated green light.

In other words, the combining prism 17 guides image light contained in the modulated blue light, the modulated red light, and the modulated green light in a direction different from a direction of non-image light. Herein, modulated light refers to light that is modulated by the liquid crystal panel 9 and is emitted from the liquid crystal panel 9. Further, image light refers to light that is contained in the in the modulated blue light, the modulated red light, and the modulated green light and should be projected onto a projection surface such as a screen. Non-image light refers to light that should not be projected onto a projection surface such as a screen.

The above-described components from the dichroic mirror 7 to the combining prism 17 constitute a color separating/combining system 200.

The illumination optical system 100 and the color separating/combining system 200 described above and a projection optical system 18 constitute an image display optical system.

The above is the configuration of the image display apparatus. Next, a description will be given of an optical function after light passes through the illumination optical system 100. First, an optical path of green light will be described.

After passing through the dichroic mirror 7, green light enters the PBS 8, and a P-polarized light component passes through a polarization splitting surface 8a and reaches the liquid crystal panel 9G. In the liquid crystal panel 9G, the green light is subjected to image modulation and is reflected. The P-polarized light component of the reflected green light subjected to image modulation passes through the polarization splitting surface 8a of the PBS 8 again, is returned toward the light source side, and is removed as non-image light. In contrast, an S-polarized light component of the green light subjected to image modulation is reflected by the polarization splitting surface 8a of the PBS 8, passes through the emission-side polarizer 14 for transmitting S-polarized light, and travels as image light toward the combining prism 17.

At this time, a fast axis or a slow axis of the quarter-wave plate 10G provided between the PBS 8 and the liquid crystal panel 9G is adjusted to a direction substantially perpendicular to a plane including an optical axis of the incident light on the PBS 8 and an optical axis of the reflected light from the PBS 8. Thus, the polarization direction of the incident light whose incident angle on the polarization splitting surface 8a of the PBS 8 is not 45° can be turned into a desired polarization direction. The quarter-wave plate 10G is a phase plate that turns the polarization direction of green light incident on the PBS 8.

In contrast, red light and blue light reflected by the dichroic mirror 7 enter the incident-side polarizer 11 for transmitting P-polarized light. After being emitted from the incident-side polarizer 11, the red light and the blue light enter the wavelength-selective phase plate 12. The wavelength-selective phase plate 12 has the function of turning the polarization direction of only red light 90 degrees. Thus, the red light as S-polarized light enters the PBS 13 as S-polarized light, and the blue light enters the PBS 13 as P-polarized light.

The red light incident as the S-polarized light on the PBS 13 is reflected by the polarization splitting surface 13a of the PBS 13, and reaches the liquid crystal panel 9R. Further, the blue light incident as the P-polarized light on the PBS 13 passes through the polarization splitting surface 13a of the PBS 13, and reaches the liquid crystal panel 9B.

The red light incident on the liquid crystal panel 9R is subjected to image modulation and is then reflected. An S-polarized light component of the reflected red light subjected to image modulation is reflected by the polarization splitting surface 13a of the PBS 13 again, is returned toward the light source side, and is removed as non-image light. In contrast, a P-polarized light component of the reflected red light subjected to image modulation passes through the polarization splitting surface 13a of the PBS 13, and travels as image light toward the combining prism 17.

That is, the PBS 13 is a polarization element that guides one of blue light and red light in a direction different from the direction of the other color light.

After passing through the PBS 13, the blue light passes through the color separation element 15, enters the liquid crystal panel 9B, is subjected to image modulation, and is then reflected. A P-polarized light component of the reflected blue light subjected to image modulation passes through the polarization splitting surface 13a of the PBS 13 again, is returned toward the light source side, and is removed as non-image light. In contrast, an S-polarized light component of the reflected blue light subjected to image modulation is reflected by the polarization splitting surface 13a of the PBS 13, and travels as image light toward the combining prism 17.

At this time, fast axes or slow axes of the quarter-wave plate 10R and the quarter-wave plate 10B provided between the PBS 13 and the liquid crystal panel 9R and the liquid crystal panel 9B, respectively, are adjusted similarly to the quarter-wave plate 10G. Thus, the polarization directions of the red light and the blue light can be turned into desired polarization directions.

The quarter-wave plate 10B is a phase plate that turns the polarization direction of the blue light emitted from the PBS 13, and the quarter-wave plate 10R is a phase plate that turns the polarization direction of the red light incident on the PBS 13.

The red light and the blue light thus combined into one and emitted from the PBS 13 enter the combining prism 17. The red light and the blue light incident on the combining prism 17 pass through the combining prism 17, are combined with the green light, and reach the projection optical system 18.

Then, the combined image light of red, green, and blue is enlarged and projected onto the projection surface, such as a screen, by the projection optical system 18.

The above-described optical paths are applied to a case in which the liquid crystal panels 9 perform white display. A description will be given below of optical paths in a case in which the liquid crystal panels 9 perform black display.

A P-polarized light component of green light passing through the dichroic mirror 7 enters the PBS 8, passes through the polarization splitting surface 8a, and reaches the liquid crystal panel 9G for green. When the liquid crystal panel 9G performs black display, the green light is reflected without being subjected to image modulation. Therefore, the green light remains as P-polarized light even after being reflected by the liquid crystal panel 9G. Hence, the green light passes through the polarization splitting surface 8a of the PBS 8 again, is returned toward the light source side, and is removed as non-image light.

Next, the optical paths of red light and blue light will be described.

Red light and blue light reflected by the dichroic mirror 7 enter the incident-side polarizer 11 for transmitting P-polarized light. After being emitted from the incident-side polarizer 11, the red light and the blue light enter the wavelength-selective phase plate 12. The wavelength-selective phase plate 12 has the function of turning the polarization direction of only the red light 90 degrees. Thus, the red light enters the PBS 13 as S-polarized light, and the blue light enters the PBS 13 as P-polarized light. The red light incident as S-polarized light on the PBS 13 is reflected by the polarization splitting surface 13a of the PBS 13, and reaches the liquid crystal panel 9R.

The blue light incident as P-polarized light on the PBS 13 passes through the polarization splitting surface 13a of the PBS 13, and reaches the liquid crystal panel 9B. Since the liquid crystal panel 9R performs black display, the red light incident on the liquid crystal panel 9R is reflected without being subjected to image modulation. Therefore, the red light remains as S-polarized light even after being reflected by the liquid crystal panel 9R. Hence, the red light is reflected by the polarization splitting surface 13a of the PBS 13 again, and is turned into P-polarized light by the wavelength-selective phase plate 12. The red light turned into the P-polarized light passes through the incident-side polarizer 11 again, is returned toward the light source side, and is removed as non-image light. Thus, black display is achieved.

In contrast, the blue light incident on the liquid crystal panel 9B is reflected without being subjected to image modulation because the liquid crystal panel 9B performs black display. Therefore, the blue light remains as P-polarized light even after being reflected by the liquid crystal panel 9B. Hence, the blue light passes through the polarization splitting surface 13a of the PBS 13 again, passes through the incident-side polarizer 11, is returned toward the light source side, and is removed as non-image light.

Since the red light, the green light, and the blue light are thus removed as non-image light, black display can be performed.

The above is the description of the configuration of the image display apparatus including the reflective liquid crystal panels. The above description assumes an ideal state in which the PBS has the property of reflecting 100% of S-polarized light contained in incident light thereon and transmitting 100% of P-polarized light contained in the incident light thereon. However, the actual state is different from the ideal state. There are S-polarized light that passes through the PBS for reflecting S-polarized light and transmitting P-polarized light, and P-polarized light that is reflected by such a PBS. Of light that should pass through the PBS or should be reflected by the PBS in the ideal state, a light component reflected by the PBS or passing through the PBS, unlike the ideal state, is referred to as unnecessary light.

In the first embodiment, unnecessary light includes a P-polarized light component that is slightly reflected by the PBS 8 in the green-light optical path during black display, an S-polarized light component of red light slightly passing through the PBS 13 in the blue-light optical path, and a P-polarized light component of blue light slightly reflected by the PBS 13 in the red-light optical path. For example, in a black display state, these unnecessary light components are projected onto the screen, and this may deteriorate the contrast of a projected image.

Herein, the ratio of luminous efficiency among green light, red light, and blue light is about 80:16:4. The relative luminosity of the red light is four times as high as the luminous efficiency of the blue light. Therefore, it is preferable particularly to reduce the influence of the red unnecessary light, of the red unnecessary light and the blue unnecessary light.

One method for suppressing deterioration of the contrast is to reduce the amount of unnecessary light by bringing the properties of the PBS closer to the ideal ones. However, it is difficult to realize the ideal properties of the PBS.

Accordingly, in the first embodiment, the color separation element 15 is provided between the PBS 13 and the quarter-wave plate 10B to reduce the amount of unnecessary light to be incident on the projection optical system 18. This can provide the color separating/combining system that projects an image of a higher quality while reducing the influence of unnecessary light.

A specific description will be given below of the principle of the color separating/combining system in which the color separation element 15 is provided to project an image of a higher quality while reducing the influence of unnecessary light, that is, suppressing deterioration of the contrast.

Figure 3:
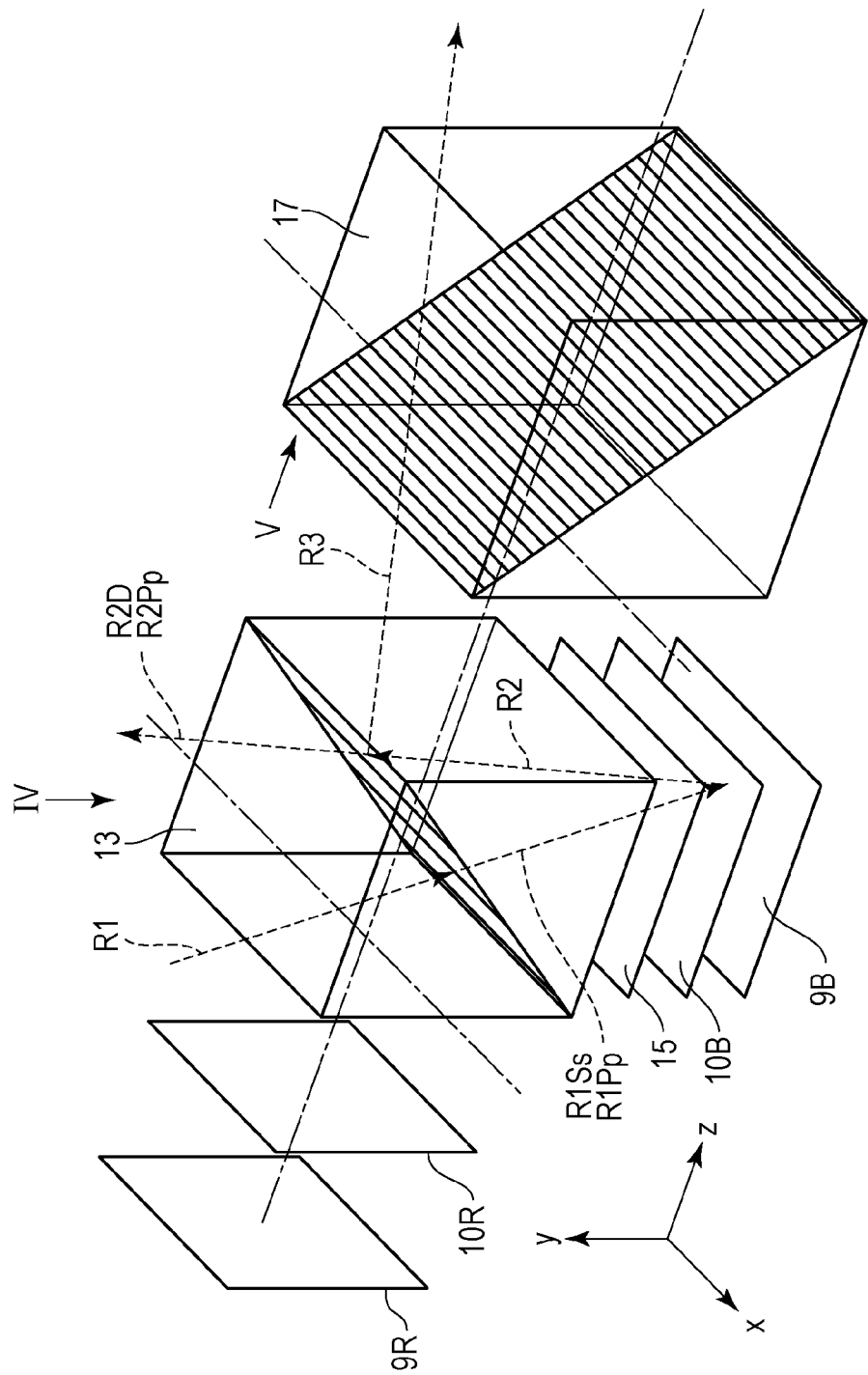
FIG. 3 illustrates details of a blue-light optical path in the color separating/combining system according to the first embodiment of the present inventions.

FIG. 3 illustrates the optical paths of blue light and red light after the wavelength-selective phase plate 12. In FIG. 3, a light beam R1 represents blue light and red light to be incident on the PBS 13, and a light beam R2 represents blue light and red light traveling from the liquid crystal panel 9B toward the PBS 13.

Polarized light beams R1Ss, R1Pp, R2D, and R2Pp are polarized in polarization directions to be described later.

Figure 4A:
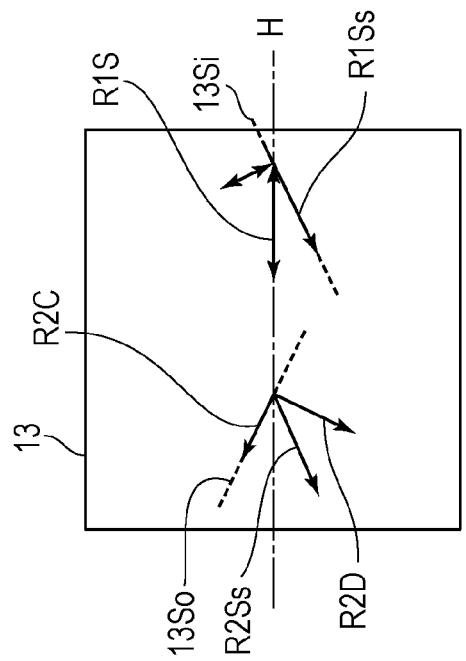
FIGS. 4A and 4B illustrate the directions of S-polarized light components in incident light and emitted light on and from a liquid crystal panel.
Figure 4B:
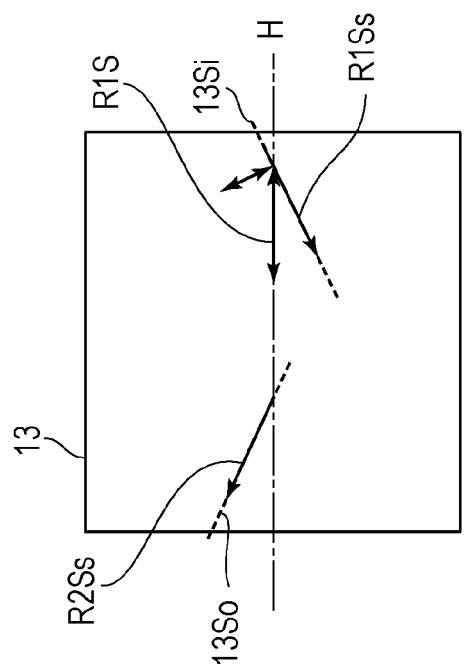

FIGS. 4A and 4B illustrate the polarization directions of red light contained in the light beam R1 to be incident on the PBS 13 and the light beam R2 traveling from the liquid crystal panel 9B toward the PBS 13, when viewed from a direction of arrow IV. FIGS. 5A and 5B illustrate the polarization direction of red light contained in a light beam R3 traveling from the PBS 13 toward the combining prism 17, when viewed from a direction of arrow V.

First, a case in which the color separation element 15 is not provided will be described with reference to FIGS. 4A and 5A. FIGS. 4A and 5A illustrate the polarization directions of red light contained in the light beams R1, R2, and R3 when the color separation element 15 is not provided.

As illustrated in FIG. 4A, red light contained in the light beam R1 is polarized light R1S that oscillates in a direction which is parallel to the X-axis direction parallel to the horizontal direction H. Here, a reference plane is defined as a plane which is parallel to the light beam R1 and the normal vector of the polarization splitting surface 13a. At this time, a reflection axis 13Si is directed in direction orthogonal to the light beam R1 in a plane that is orthogonal to the reference plane. That is, the reflection axis 13Si is the polarization direction that is determined, irrespective of the polarization direction of the polarized light R1S.

In an ideal state, a polarized light component R1Ss of polarized light R1S parallel to the reflection axis 13Si is reflected by the PBS 13, and travels toward the liquid crystal panel 9R. In other words, the PBS 13 has the property of reflecting polarized light parallel to the reflection axis 13Si and transmitting polarized light perpendicular to the reflection axis 13Si.

However, as described above, even when part of the polarized light component R1Ss is parallel to the reflection axis 13Si, it passes through the PBS 13 and travels toward the liquid crystal panel 9B. This part of light becomes unnecessary light.

Although the polarized light component R1Ss passed through the PBS 13 is not modulated by the liquid crystal panel 9B in a black display state, it passes through the quarter-wave plate 10B twice and enters the PBS 13 again. That is, while the polarized light component R1Ss is polarized in a direction inclined in the counterclockwise direction with respect to the X-axis, a polarized light component R2Ss traveling from the liquid crystal panel 9B toward the PBS 13 is polarized in a direction inclined in the clockwise direction with respect to the X-axis, in contrary to the polarized light component R1Ss.

A reflection axis 13So is a direction of polarized light to oscillate in a plane that is orthogonal to a plane including the incident direction of the light beam R2 on the polarization splitting surface 13a and the normal vector of the polarization splitting surface 13a and that includes the light beam R2. That is, the reflection axis 13So is a polarization direction determined, irrespective of the polarization direction of the polarized light component R2Ss.

The reflection axis 13So of the PBS 13 for the polarized light component R2Ss is inclined in the clockwise direction with respect to the X-axis, in contrary to the reflection axis 13Si of the PBS 13 for the polarized light component R1Ss. This is because the incident direction of the light beam R1 on the polarization splitting surface 13a and the incident direction of the light beam R2 on the polarization splitting surface 13a are symmetrical with respect to the Y-axis.

More specifically, as described above, each of the reflection axis 13Si and the reflection axis 13So is the direction of the polarized light to oscillate in the plane orthogonal to the plane including the incident direction of the light beam R1 or R2 on the polarization splitting surface 13a and the normal vector of the polarization splitting surface 13a and that includes the light beam R1 or R2. Since the light beam R2 is reflected by the liquid crystal panel 9B, the incident direction of the light beam R1 on the polarization splitting surface 13a and the incident direction of the light beam R2 on the polarization splitting surface 13a are symmetrical with respect to the Y-axis. On the other hand, the normal vector of the polarization splitting surface 13a is fixed, and the reflection axis intersects the traveling direction of the light beam at right angles.

For this reason, in contrary to the reflection axis 13Si, the reflection axis 13So is inclined in the clockwise direction with respect to the X-axis. In other words, the reflection axis 13Si and the reflection axis 13So are symmetrical with respect to the X-axis orthogonal to the Y-axis.

The polarization direction of the polarized light component R2Ss is inclined in the clockwise direction with respect to the X-axis, similarly to the reflection axis 13So. Therefore, the polarized light component R2Ss is reflected as unnecessary light by the PBS 13 and enters the combining prism 17 as the light beam R3, in spite of the black display state.

The polarization direction of the polarized light component R2Ss is not changed while the polarized light component R2Ss travels from the PBS 13 into the combining prism 17. For this reason, as illustrated in FIG. 5A, a polarized light component R3Ss representing the polarization direction of the light beam R3 is inclined in the clockwise direction with respect to the X-axis, similarly to the polarized light component R2Ss.

For the red light, the combining prism 17 functions as a PBS having the property similar to that of the PBS 13. A reflection axis 17Si is the direction of polarized light to oscillate in a plane that is orthogonal to a plane including the incident direction of the light beam R3 on the polarization splitting surface 17a of the combining prism 17 and the normal vector of the polarization splitting surface 17a and that includes the light beam R3. That is, the combining prism 17 reflects polarized light parallel to the reflection axis 17Si and transmits polarized light perpendicular to the reflection axis 17Si.

As illustrated in FIG. 5A, the reflection axis 17Si of the combining prism 17 for the light beam R3 is inclined in the counterclockwise direction with respect to the X-axis. Further, the polarized light component R3Ss is inclined in the clockwise direction with respect to the X-axis. For this reason, a component of the polarized light component R3Ss perpendicular to the reflection axis 17Si passes through the combining prism 17, travels toward the projection optical system 18, and is projected on the screen or the like.

That is, when the color separation element 15 is not provided, unnecessary red light mixed in the blue-light optical path is projected on the screen or the like, in spite of the black display state. This may deteriorate the contrast of a projected image.

The above is the description of the case in which the color separation element 15 is not provided. Next, a case in which the color separation element 15 is provided, as in the first embodiment, will be described with reference to FIGS. 4B and 5B.

Similarly to the above-described case in which the color separation element 15 is not provided, part of a polarized light component R1Ss passes through the PBS 13 and travels toward the liquid crystal panel 9B. However, when the color separation element 15 is provided, the polarized light component R1Ss does not pass through the quarter-wave plate 10B, but is reflected by the color separation element 15 and enters the PBS 13. This is because the color separation element 15 having the property of transmitting blue light and reflecting red light is provided between the PBS 13 and the quarter-wave plate 10B.

A polarized light component R2Ss reflected by the color separation element 15 does not pass through the quarter-wave plate 10B. Hence, the polarization direction is not changed from that of the polarized light component R1Ss, and is inclined in the counterclockwise direction with respect to the X-axis, as illustrated in FIG. 4B. A component R2D of the polarized light component R2Ss perpendicular to the reflection axis 13So passes through the PBS 13. Hence, the amount of unnecessary light traveling toward the combining prism 17 can be reduced. That is, it is possible to suppress the above-described deterioration of the contrast caused by the absence of the color separation element 15, in spite of the black display state.

In contrast, a component R2C of the polarized light component R2Ss parallel to the reflection axis 13So is reflected by the PBS 13 and enters the combining prism 17.

That is, in the above-described case in which the color separation element 15 is not provided, most of the polarized light component R2Ss travels from the PBS 13 toward the combining prism 17. In contrast, when the color separation element 15 is provided, only the component R2C of the polarized light component R2Ss travels from the PBS 13 toward the combining prism 17. Therefore, in the black display state, the color separation element 15 can reduce the amount of polarized light component R2Ss traveling from the PBS 13 toward the combining prism 17.

A polarized light component R3Ss reflected by the PBS 13 and entering the combining prism 17, that is, the component R2C is polarized in the direction inclined in the clockwise direction with respect to the X-axis, as illustrated in FIG. 5B, similarly to the case in which the color separation element 15 is not provided. For this reason, similarly to the case in which the color separation element 15 is not provided, a component of the polarized light component R3Ss perpendicular to the reflection axis 17Si passes through the combining prism 17, travels toward the projection optical system 18, and is projected on the screen or the like. However, when the color separation element 15 is provided, as described above, since the amount of polarized light component R3Ss can be reduced, the amount of unnecessary light to be projected on the screen or the like can also be reduced.

By thus providing the color separation element 15 between the quarter-wave plate 10B and the PBS 13, it is possible to provide the color separating/combining system that can project an image of a higher quality while reducing the influence of unnecessary light.

While the red light has been described above, the blue light in the black display state can be suppressed by the quarter-wave plate 10B from being guided to the projection optical system 18 as follows.

FIGS. 6A and 6B illustrate a polarization state of blue light in the light beam R1 incident on the PBS 13 and the light beam R2 traveling from the liquid crystal panel 9B toward the PBS 13. FIG. 6A illustrates a case in which the quarter-wave plate 10B is not provided.

As illustrated in FIG. 6A, blue light contained in the light beam R1 is polarized light R1P that oscillates in a direction parallel to the Z-axis direction orthogonal to the horizontal direction H. A transmission axis 13Pi is the polarization direction of polarized light determined in a plane including the incident direction of the light beam R1 on the polarization splitting surface 13a and the normal vector of the polarization splitting surface 13a. That is, the transmission axis 13Pi is the polarization direction determined irrespective of the polarization direction of the polarized light R1P.

In an ideal state, a polarized light component R1Pp of the polarized light R1P parallel to the transmission axis 13Pi passes through the PBS 13. In other words, the PBS 13 has the property of transmitting polarized light parallel to the transmission axis 13Pi and reflecting polarized light perpendicular to the transmission axis 13Pi.

The polarized light component R1Pp passed through the PBS 13 is not modulated by the liquid crystal panel 9B in the black display state. Hence, the polarized light component R1Pp is reflected without changing its polarization direction, and travels toward the PBS 13. That is, in this case, a polarized light component R2Pp traveling from the liquid crystal panel 9B toward the PBS 13 is polarized in a direction inclined in the counterclockwise direction with respect to the Z-axis, similarly to the polarized light component R1Pp.

A transmission axis 13Po is a direction in which the polarized light component R2Pp oscillates in a plane including the incident direction of the light beam R2 on the polarization splitting surface 13a and the normal vector of the polarization splitting surface 13a. That is, the transmission axis 13Po is a polarization direction determined irrespective of the polarization direction of the polarized light R2P.

The transmission axis 13Po of the PBS 13 for the polarized light component R2Pp is inclined in the clockwise direction with respect to the Z-axis, in contrary to the transmission axis 13Pi of the PBS 13 for the polarized light component R1Pp. This is based on the principle similar to the above-described difference in the polarization direction between the reflection axis 13So and the reflection axis 13Si.

A component of the polarized light component R2Pp perpendicular to the transmission axis 13Po is reflected by the PBS 13 and travels toward the combining prism 17. That is, although it is not preferable that color light travels toward the combining prism 17 in the black display state, part of the blue light travels toward the combining prism 17 when the quarter-wave plate 10B is not provided.

As described above, for blue light and green light, the combining prism 17 functions as a dichroic mirror that transmits the blue light and reflects the green light. Since the part of the polarized light component R2Pp traveling toward the combining prism 17 is blue light, it passes through the combining prism 17, travels toward the projection optical system 18, and is projected onto the screen or the like. As a result, the contrast may be deteriorated.

The above is the description of the case in which the quarter-wave plate 10B is not provided. Next, a case in which the quarter-wave plate 10B is provided, as in the first embodiment, will be described with reference to FIG. 6B.

The process until transmission of a polarized light component R1Pp through the PBS 13 is similar to that in the above-described case in which the quarter-wave plate 10B is not provided. When the quarter-wave plate 10B is provided, since blue light passes through the quarter-wave plate 10B twice, a polarized light component R2Pp is polarized in a direction inclined in the clockwise direction with respect to the Z-axis, unlike the polarized light component R1Pp. Further, as described above, the transmission axis 13Po of the PBS 13 for the polarized light component R2Pp is inclined in the clockwise direction with respect to the Z-axis, in contrary to the direction for the polarized light component R1Pp. That is, when the quarter-wave plate 10B is provided, the polarized light component R2Pp passes through the PBS 13 because the polarization direction of the polarized light component R2Pp coincides with the transmission axis 13Po. Hence, it is possible to reduce the amount of unnecessary light traveling toward the combining prism 17. As a result, deterioration of the contrast can be suppressed.

The above effects are obtained by the color separating/combining system having the configuration of the first embodiment. The first embodiment also adopts the following structures to further enhance the above effects or to obtain other effects. However, the present inventions are not limited to a color separating/combining system having all of the following structures.

More preferable conditions in the first embodiment will be described. FIGS. 7A and 7B illustrate a y-z plane and an x-y plane, respectively, of the section of the optical system from the PBS 13 to the liquid crystal panel 9B.

Herein, the direction parallel to the longer-side direction of the liquid crystal panel 9B is referred to as an x-axis direction (first direction), the direction parallel to the shorter-side direction of the liquid crystal panel 9B is referred to as a z-axis direction (second direction), and the direction orthogonal to the x-axis direction and the z-axis direction is referred to as a y-axis direction (third direction).

Further, a surface of the PBS 13 which is parallel to the x-axis direction and the z-axis direction and on which a light beam from the dichroic mirror 7 is to be incident is referred to as an incident surface. In the first embodiment, the PBS 13 is a prism type PBS, and a surface of a prism that constitutes the prism type PBS, on which a light beam from the dichroic mirror 7 is to be incident, is referred to as an incident surface IS. In other words, in the first embodiment, a surface of the prism that constitutes the prism type PBS, which is the farthest from the liquid crystal panel 9B, is referred to as the incident surface IS.

Further, a part of a region of the incident surface IS where the light beam incident on the PBS 13 illuminates the incident surface IS is referred to as a PBS effective illumination region DA (first region). A region of the liquid crystal panel 9B where the light beam emitted from the PBS 13 illuminates the liquid crystal panel 9B is referred to as a panel effective illumination region PA (second region).

More specifically, in the first embodiment, the PBS effective illumination region DA is a section that is separated at 50% of the maximum luminance from the region where the light beam incident on the PBS 13 illuminates the incident surface IS.

Similarly, in the first embodiment, the panel effective illumination region PA is a section that is separated at 50% of the maximum luminance from the region where the light beam emitted from the PBS 13 illuminates the liquid crystal panel 9B.

Further, when D1 represents the dimension of the region DA in the x-axis direction, D2 represents the dimension of the region DA in the z-axis direction, P1 represents the dimension of the region PA in the x-axis direction, and P2 represents the dimension of the region PA in the z-axis direction, it is preferable to satisfy the following condition:

$$1.1 < (D1-P1)/(D2-P2) < 2.0$$

It is more preferable to satisfy the following condition:

$$1.2 < (D1-P1)/(D2-P2) < 1.8$$

The advantage obtained by satisfying the above conditions will be described. In the first embodiment of the present inventions, D1 is larger than P1, and D2 is larger than P2.

As illustrated in FIG. 7A, the optical system is generally designed so that incident angles of a plurality of light beams incident on the polarization splitting surface 13a are as equal as possible in a cross section where the normal vector of the polarization splitting surface 13a exists. It is known that this improves the contrast of a projected image. This is because the incident angle such that the polarization and splitting efficiency of the polarization splitting surface becomes the highest is determined by the film property such as the refractive indices of glass used in the prism that constitutes the PBS and the material used in a film provided on the polarization splitting surface. That is, it is preferable that the difference between the incident angle of the light beam incident on the polarization splitting surface and the incident angle such as the polarization and splitting efficiency becomes the highest should be as small as possible.

To realize such an incident angle, for example, it is conceivable to limit light beams incident on the polarization splitting surface to light beam having an incident angle smaller than a predetermined incident angle by a diaphragm. However, in this case, the number of light beams that do not enter the liquid crystal panel, of the light beams emitted from the light source, increases. This may reduce the utilization efficiency and brightness of a projected image.

Accordingly, as illustrated in FIG. 7B, in a cross section where the normal vector of the polarization splitting surface 13a does not exist and which is parallel to the longer-side direction of the liquid crystal panel 9B, a light beam having an incident angle larger than the incident angle in the cross section of FIG. 7A is caused to enter the liquid crystal panel 9B. That is, the F-number in the cross section of FIG. 7B is made smaller than the F-number in the cross section of FIG. 7A. This enhances brightness of a projected image that may decrease in the cross section of FIG. 7A.

By thus designing the optical system, a brighter image can be projected while suppressing deterioration of the contrast due to the film property of the polarization splitting surface. In other words, in this optical system, the F-number of the liquid crystal panel 9 is smaller in the longer-side direction than in the shorter-side direction.

However, in the cross section of FIG. 7B, as described above, the contrast of the projected image may be deteriorated by unnecessary light guided to the projection optical system in the black display state.

Accordingly, it is preferable in the first embodiment to satisfy the following conditions:

$$P1 > P2$$

$$1.1 < (D1-P1)/(D2-P2) < 2.0$$

It is more preferable to satisfy the following condition:

$$1.2 < (D1-P1)/(D2-P2) < 1.8$$

The optical system that satisfies the above conditions is such that the F-number of the liquid crystal panel 9B in the longer-side direction is smaller than in the shorter-side direction, as described above. In other words, as illustrated in FIGS. 7A and 7B, the optical system is such that the incident angle on the liquid crystal panel 9B in the x-y plane is larger than the incident angle on the liquid crystal panel 9B in the y-z plane. Further, the optical system is such that the brightness is higher in the longer-side direction of the liquid crystal panel 9B, and is lower in the shorter-side direction of the liquid crystal panel 9B.

That is, in the first embodiment of the present inventions, the optical system that satisfies the above conditions is obtained by applying the structures of the first embodiment to an optical system in which the F-number of the liquid crystal panel 9B in the longer-side direction is smaller than in the shorter-side direction. This allows a brighter image to be projected while suppressing deterioration of the contrast due to unnecessary light and deterioration of the contrast due to the film property of the polarization splitting surface.

A numerical embodiment of the present inventions is shown in Table.

TABLE

| D1 | D2 | P1 | P2 | (D1/P1)/(D2 − P2) |
|---|---|---|---|---|
| 19.37 | 12.80 | 17.86 | 11.80 | 1.51 |
| 19.62 | 12.70 | 17.86 | 11.80 | 1.96 |
| 19.45 | 12.20 | 18.39 | 11.28 | 1.15 |
| 19.35 | 12.02 | 18.39 | 11.28 | 1.30 |
| 19.69 | 12.02 | 18.39 | 11.28 | 1.76 |

Second Embodiment

Figure 8:
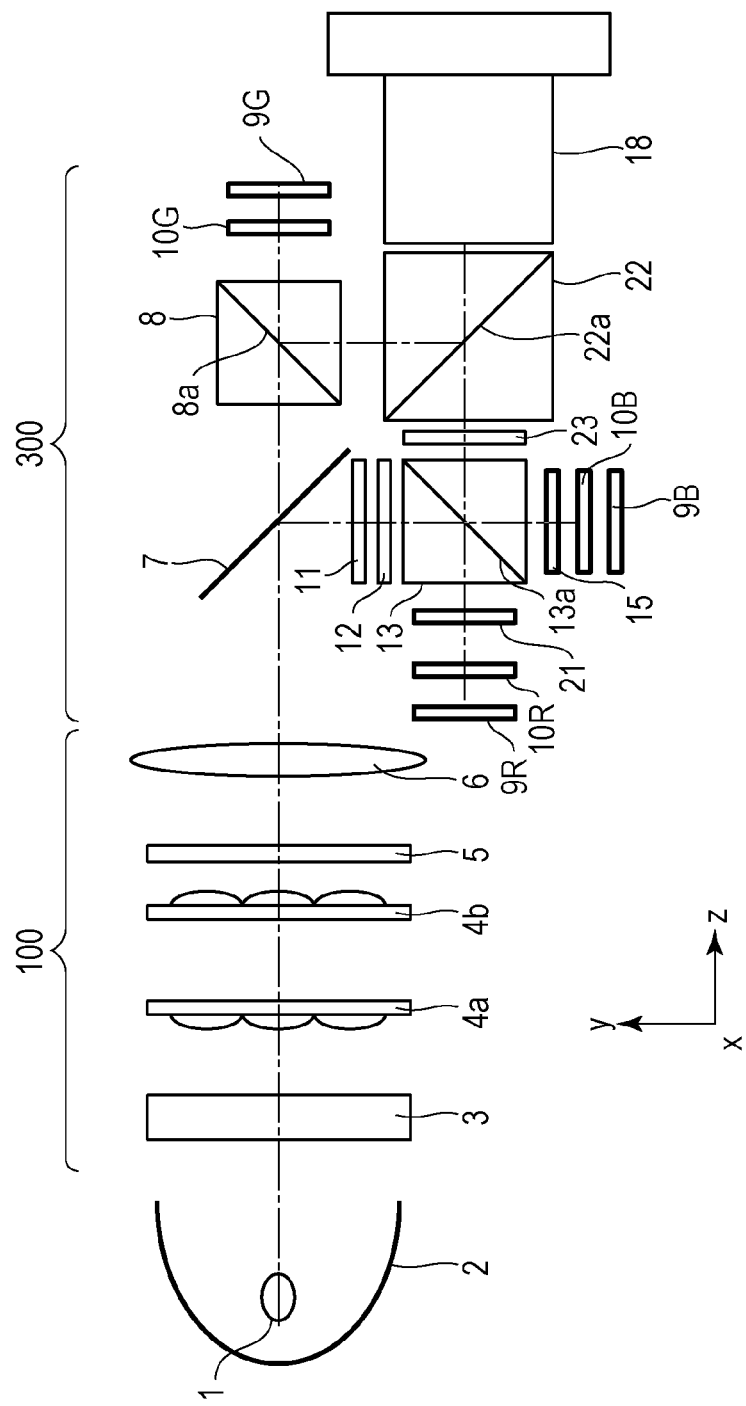
FIG. 8 illustrates the configuration of an image display apparatus including a color separating/combining system according to a second embodiment of the present inventions.

FIG. 8 illustrates the configuration of an image display apparatus including a color separating/combining system according to a second embodiment of the present inventions.

The second embodiment is different from the first embodiment in further including a color separation element 21 and a wavelength-selective phase plate 23 and replacing the combining prism 17 with a PBS 22.

The color separation element 21 is provided between a PBS 13 and a quarter-wave plate 10R, and guides red light to the quarter-wave plate 10R and suppresses blue light from being guided to the quarter-wave plate 10R.

As described above, it is preferable, from the viewpoint of luminous efficiency, to reduce the amount of unnecessary red light. However, it is more preferable to also reduce the amount of unnecessary blue light.

For that purposes, in the second embodiment, the color separation element 21 is provided between the PBS 13 and the quarter-wave plate 10R. The color separation element 21 has the property of transmitting red light and reflecting blue light to suppress unnecessary blue light mixed in a red-light optical path from being guided to a liquid crystal panel 9R.

Further, in the second embodiment, a wavelength-selective phase plate 23 is provided between the PBS 13 and a PBS 22. The wavelength-selective phase plate 23 has the property of turning the polarization direction of only blue light 90 degrees. Hence, blue light is turned into P-polarized light and is then guided to the PBS 22.

And, an S-polarized light component of green light and a P-polarized light component of red light enter the PBS 22. The PBS 22 has the property of transmitting P-polarized light and reflecting S-polarized light.

Blue light will be described. In the above-described first embodiment, blue light enters the combining prism 17 as S-polarized light. However, in the second embodiment, blue light is turned into P-polarized light by the wavelength-selective phase plate 23, and then enters the PBS 22. Since the PBS 22 transmits P-polarized light and reflects S-polarized light, an S-polarized light component of green light, a P-polarized light component of red light, and a P-polarized light component of blue light are guided to a projection optical system 18. This allows color images of red, green, and blue to be projected on a screen or the like.

This structure can provide the color separating/combining system that can project an image of a higher quality while making the influence of unnecessary light less than in the above-described first embodiment.

Instead of an antireflection film on a surface of the PBS 13 on a side of the liquid crystal panel 9R, a film having properties similar to those of the color separation element 21 may be provided.

Further, a quarter-wave phase difference film may be provided on a surface of the quarter-wave plate 10R on a side of the liquid crystal panel 9R, and a film having properties similar to those of the color separation element 21 may be provided on a surface of the quarter-wave plate 10R on a side of the PBS 13.

Third Embodiment

Figure 9:
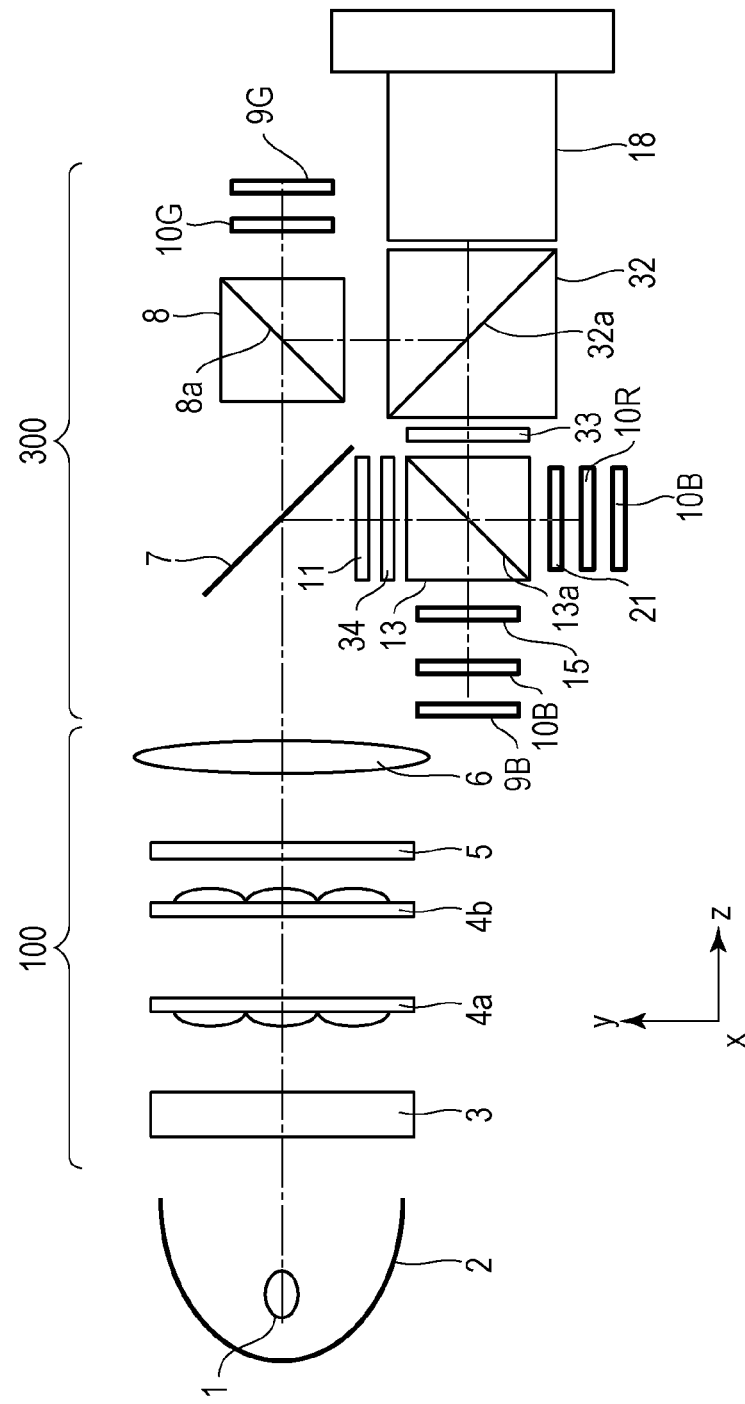
FIG. 9 illustrates the configuration of an image display apparatus including a color separating/combining system according to a third embodiment of the present inventions.

FIG. 9 illustrates the configuration of an image display apparatus including a color separating/combining system according to a third embodiment of the present inventions.

The third embodiment is different from the above-described second embodiment in replacing the wavelength-selective phase plate 12 with a wavelength-selective phase plate 34, replacing the wavelength-selective phase plate 23 with a half-wave plate 33, and replacing the PBS 22 with a wavelength-selective PBS 32.

Further, unlike the above-described embodiments, the direction in which light passes through a PBS 13 corresponds to a red-light optical path.

The wavelength-selective phase plate 34 turns a P-polarized light component of only blue light into an S-polarized light component, but does not turn the polarization direction of red light. That is, in the third embodiment, blue light enters the PBS 13 as S-polarized light, and red light enters the PBS 13 as P-polarized light.

Unnecessary blue light and unnecessary red light emitted from the PBS 13 enter the half-wave plate 33, where their polarization directions are changed. Specifically, in a black display state, unnecessary blue light is turned from S-polarized light into P-polarized light, and unnecessary red light is turned from P-polarized light into S-polarized light.

That is, the half-wave plate 33 turns the polarization direction, regardless of the wavelength, unlike the wavelength-selective phase plate 23.

A light beam from the half-wave plate 33 enters the wavelength-selective PBS 32. The wavelength-selective PBS 32 has a polarization splitting surface 32a. The wavelength-selective PBS 32 transmits blue light, regardless of the polarization direction, transmits a P-polarized light component of red light, and reflects an S-polarized light component of the red light. Further, the wavelength-selective PBS 32 reflects green light, regardless of the polarization direction.

That is, in the black display state, unnecessary blue light passes through the wavelength-selective PBS 32, and unnecessary red light is reflected by the polarization splitting surface 32*a*.

In this way, in the third embodiment, part of unnecessary blue light is guided to a screen, but unnecessary red light can be suppressed from being guided to the screen.

As described above, the relative luminosity of red light is higher than the relative luminosity of blue light. For this reason, it is preferable that at least unnecessary red light mixed in the blue-light optical path, of unnecessary blue light mixed in the red-light optical path and unnecessary red light mixed in the blue-light optical path, should not be guided to the screen.

For this reason, in the above-described embodiments, when the relative luminosity of a second color light is higher than the relative luminosity of a first color light, the first optical portion having the property of transmitting the first color light and reflecting the second color light is provided in the normal optical path of the first color light. Specifically, the first color light is blue light, and the second color light is red light.

OTHER EMBODIMENTS

In the above-described embodiments, the color separation element 15 is the first optical portion having the property of transmitting a P-polarized light component of blue light and reflecting an S-polarized light component of red light. However, the present inventions are not limited thereto. The color separation element 15 may be a first optical portion that transmits blue light and reflects red light, regardless of the polarization direction.

Alternatively, the color separation element 15 may be a first optical portion that transmits a P-polarized component of blue light and absorbs an S-polarized light component of red light, or a first optical portion that transmits blue light and absorbs red light.

Similarly, while the above-described color separation element 21 is the second optical portion having the property of transmitting red light and reflecting blue light, it may be a second optical portion that transmits red light and absorbs blue light.

While the color separation element 15 is provided between the PBS 13 and the quarter-wave plate 10B in the above-described embodiments, the present inventions are not limited thereto. Without providing the color separation element 15 between the PBS 13 and the quarter-wave plate 10B, a film having properties similar to those of the color separation element 15 may be applied on a surface of the PBS 13 on a side of the liquid crystal panel 9B instead of the antireflection film. Further, the color separation element 15 and the quarter-wave plate 10B may be replaced with a glass substrate in which the surface of the glass substrate on the side of the liquid crystal panel 9B is configured with a film having properties similar to those of the quarter-wave plate 10B and a surface of the glass substrate on the side of the PBS 13 is coated with a film having properties similar to those of the color separation element 15.

Further, when the color separation element 15 is the first optical portion that transmits a P-polarized light component of blue light and absorbs an S-polarized light component of red light, it may be provided between the quarter-wave plate 10B and the liquid crystal panel 9B. In other words, it is only necessary that the quarter-wave plate 10B and the color separation element 15 should be provided on the optical path of blue light.

Further, when the color separation element 21 is the second optical portion that transmits red light and absorbs blue light, it may be provided between the quarter-wave plate 10R and the liquid crystal panel 9R. In other words, it is only necessary that the quarter-wave plate 10R and the color separation element 21 should be provided on the optical path of red light.

In the above-described embodiments, the image display apparatus that can include the color separating/combining system of the embodiments is provided with the projection optical system. However, the present inventions are not limited thereto. For example, the image display apparatus may use a detachable projection optical system.

While the illumination device using a high-pressure mercury lamp is adopted in a part of the above-described embodiments, the present inventions are not limited thereto. As long as the light source emits white light, for example, a blue LED or a blue LD (semiconductor laser) may be combined with a fluorescent member. Further, the present inventions are not limited to the structure in which only one light source is provided. For example, a plurality of LEDs or LDs may be arranged in an array.

While the color separating/combining system according to the above embodiments uses the PBS that reflects S-polarized light and transmits P-polarized light, the present inventions are not limited thereto. The properties of the PBS may be appropriately changed, for example, according to the configuration of the image display apparatus and the light emitting property of the light source. For example, the PBS may have the property of reflecting P-polarized light and transmitting S-polarized light.

While the advantages of the above-described embodiments in the black display state in which the liquid crystal panel does not perform polarization conversion have been described, the present inventions are not limited to the black display state.

Even in a state in which a color image is displayed, as described above, when unnecessary red light is mixed in the optical path of blue light, red color of a desired brightness is not displayed and this may deteriorate the quality of a projected image. Therefore, even in the color display state, the configuration of the embodiments of the present inventions can provide the color separating/combining system that can project an image of a higher quality while reducing the influence of unnecessary light. Particularly when a low-gradation image is projected, deterioration of the contrast can be further suppressed by applying the configuration of the embodiments of the present inventions.

In the above-described embodiments, the color separation elements 15 and 21 each have the structure in which the surface of the glass substrate on the side of the PBS 13 is coated with the dichroic film, and the quarter-wave plates 10B and 10R are each have the structure in which the surface of the glass substrate on the side of the liquid crystal panel is provided with the phase difference film. That is, the above-described embodiments, the color separation element and the quarter-wave plate are provided separately from each other. However, the present inventions are not limited thereto. A glass substrate in which a surface on the side of the PBS 13 is coated with a dichroic film and a surface on the side of the liquid crystal panel is provided with the phase difference film may be used. That is, the color separation element and the quarter-wave plate may be integrally formed.

Further, the quarter-wave plates 10B and 10R may each be formed by a crystal having birefringence without adopting the structure in which the surface of the glass substrate on the side of the liquid crystal panel is provided with the phase difference film.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-093884, filed Apr. 30, 2014, and No. 2015-086264, filed Apr. 20, 2015, which are hereby incorporated by reference herein in their entirety.

What is claimed is:

1. A color separating and/or combining system configured to guide a first color light in a light beam from a light source to a first light modulation element and to guide a second color light that is different in wavelength from the first color light to a second light modulation element, the color separating and/or combining system comprising:
a first polarization element configured to guide one of the first color light and the second color light in a direction different from a direction of the other color light based on polarization directions of the first color light and the second light;
a first phase difference imparting portion; and
a first optical portion configured to guide the first color light to the first light modulation element and to suppress the second color light from being guided to the first light modulation element,
wherein the first phase difference imparting portion and the first optical portion are provided between the first light modulation element and the first polarization element, and
wherein the first optical portion is provided between the first polarization element and the first phase difference imparting portion.

2. The color separating and/or combining system according to claim 1,
wherein the first optical portion has a property of transmitting the first color light and reflecting the second color light.

3. The color separating and/or combining system according to claim 1,
wherein a relative luminosity of the second color light is higher than a relative luminosity of the first color light.

4. The color separating and/or combining system according to claim 1, further comprising:
a second phase difference imparting portion; and
a second optical portion configured to guide the second color light to the second light modulation element and to suppress the first color light from being guided to the second light modulation element,
wherein the second phase difference imparting portion and the second optical portion are provided between the second light modulation element and the first polarization element,
wherein the second optical portion has a property of transmitting the second color light and reflecting the first color light, and
wherein the second optical portion is provided between the first polarization element and the second phase difference imparting portion.

5. A color separating and/or combining device comprising:
a color separating and/or combining system configured to guide a first color light in a light beam from a light source to a first light modulation element configured to modulate the first color light and to emit a first modulated light and to guide a second color light that is different in wavelength from the first color light to a second modulation element configured to modulate the second color light and to emit a second modulated light, the color separating and/or combining system comprising: (i) a first polarization element configured to guide one of the first color light and the second color light in a direction different from a direction of the other color light based on polarization directions of the first color light and the second light; (ii) a first phase difference imparting portion; (iii) a first optical portion configured to guide the first color light to the first light modulation element and to suppress the second color light from being guided to the first light modulation element;
a second optical portion configured to guide the first color light and the second color light in the light beam from the light source in a direction different from a direction of a third color light that is different in wavelength from the first color light and the second color light;
a second polarization element configured to guide a light component in a first polarization direction of the third color light in a direction different from a direction of a light component in a second polarization direction that is different in polarization direction from the light component in the first polarization direction;
a second phase difference imparting portion;
a third light modulation element configured to modulate the third color light and to emit a third modulated light; and
a light combining element configured to combine the first modulated light, the second modulated light, and the third modulated light,
wherein the first phase difference imparting portion and the first optical portion are provided between the first light modulation element and the first polarization element, and
wherein the first optical portion is provided between the first polarization element and the first phase difference imparting portion.

6. The color separating and/or combining device according to claim 5,
wherein, when (i) a direction parallel to a longer-side direction of the first light modulation element is a first direction, (ii) a direction parallel to a shorter-side direction of the first light modulation element is a second direction, (iii) a surface of the first polarization element extending parallel to the first direction and the second direction so that the light from the second optical portion is incident thereon is an incident surface, (iv) a region of the incident surface where the light beam incident on the first polarization element illuminates the incident surface is a first region, and (v) a region of the first light modulation element where the light emitted from the first polarization element illuminates the first light modulation element is a second region, the following conditions are satisfied:

$P1 > P2$, and $1.1 < (D1-P1)/(D2-P2) < 2.0$ where D1 represents a dimension of the first region in the first direction, D2 represents a dimension of the first region in the second direction, P1 represents a dimension of the second region in the first direction, and P2 represents a dimension of the second region in the second direction.

7. An image display apparatus comprising:
a light source device;
a color separating and/or combining device; and
an illumination optical system configured to guide a light beam from the light source device to the color separating and/or combining device,
wherein the color separating and/or combining device includes:
a color separating and/or combining system configured to guide a first color light in the light beam from the light source device to a first light modulation element configured to modulate the first color light and to emit a first modulated light and to guide a second color light that is different in wavelength from the first color light to a second light modulation element configured to modulate the second color light and to emit a second modulated light, the color separating and/or combining system comprising: (i) a first polarization element configured to guide one of the first color light and the second color light in a direction different from a direction of the other color light based on polarization directions of the first color light and the second light; (ii) a first phase difference imparting portion; (iii) a first optical portion configured to guide the first color light to the first light modulation element and to suppress the second color light from being guided to the first light modulation element;
a second optical portion configured to guide the first color light and the second color light in the light beam from the light source device in a direction different from a direction of a third color light that is different in wavelength from the first color light and the second color light;
a second polarization element configured to guide a light component in a first polarization direction of the third color light in a direction different from a direction of a light component in a second polarization different that is different in polarization direction from the light component in the first polarization direction;
a second phase difference imparting portion;
a third light modulation element configured to modulate the third color light and to emit a third modulated light; and
a light combining element configured to combine the first modulated light, the second modulated light, and the third modulated light,
wherein the first phase difference imparting portion and the first optical portion are provided between the first light modulation element and the first polarization element, and
wherein the first optical portion is provided between the first polarization element and the first phase difference portion.

* * * * *